United States Patent [19]

Dix

[11] Patent Number: 4,474,921

[45] Date of Patent: Oct. 2, 1984

[54] ARYLENE SULFIDE COMPOSITIONS CONTAINING CALCIUM SULFATE

[75] Inventor: James S. Dix, Bartlesville, Okla.

[73] Assignee: Phillips Petroleum Company, Bartlesville, Okla.

[21] Appl. No.: 484,398

[22] Filed: Apr. 13, 1983

Related U.S. Application Data

[63] Continuation of Ser. No. 350,949, Feb. 22, 1982, abandoned.

[51] Int. Cl.$^3$ ............................................. C08K 3/30
[52] U.S. Cl. .................................. 524/423; 524/445; 524/494; 524/609
[58] Field of Search ................ 524/423, 445, 494, 609

[56] References Cited

U.S. PATENT DOCUMENTS

| | | | |
|---|---|---|---|
| 3,929,708 | 12/1975 | Brady et al. | 260/29.1 SB |
| 3,954,932 | 5/1976 | Coale | 264/122 |
| 4,134,874 | 1/1979 | Needham | 260/37 SB |
| 4,176,098 | 11/1979 | Needham | 260/18 R |

*Primary Examiner*—Melvyn I. Marquis
*Attorney, Agent, or Firm*—A. W. Umphlett

[57] ABSTRACT

A composition of matter comprising poly(arylene sulfide), fiberglass, and calcium sulfate. A method for producing compositions that is compared with compositions outside of this invention upon molding provide improved insulation resistance and improved surface gloss by admixing calcium sulfate having an average particle size in a range of about 0.5 micron to about 5 microns with poly(arylene sulfide) and fiberglass.

20 Claims, No Drawings

ARYLENE SULFIDE COMPOSITIONS CONTAINING CALCIUM SULFATE

This application is a continuation application of my co-pending application, Ser. No. 350,949, filed Feb. 22, 1982 now abandoned.

BACKGROUND OF THE INVENTION

This invention relates to poly(arylene sulfide) and, more particularly, to compositions of arylene sulfide polymer and filler materials. In another of its aspects this invention relates to arylene sulfide polymer compositions having good insulation resistance. In yet another aspect of this invention it relates to arylene sulfide polymer compositions having good surface gloss. In yet another aspect of the invention it relates to the addition of calcium sulfate to polymeric compositions.

One of the important uses of poly(arylene sulfide) is in molding compositions. By combining poly(arylene sulfide) with reinforcing agents such as fiberglass and with fillers, molding compositions can be tailored for certain end uses. Up until now a composition in which poly(arylene sulfide), fiberglass, and calcium carbonate are combined has been a standard for providing molding compositions having good strength, good insulation resistance, and good surface gloss. It has now been found that by substituting calcium sulfate for the calcium carbonate in these compositions that compounds that upon molding have better surface gloss and insulation resistance than those containing calcium carbonate and having equally good strength characteristics can be produced. It has also been found that by restricting the particle size of the calcium sulfate incorporated in the compositions to a finely ground material that the surface gloss and insulation resistance of the molded products can be further improved. Articles such as automotive headlamp reflectors and the like molded from the invention compositions exhibit a good balance of mechanical properties and smooth surfaces.

It is therefore an object of this invention to provide molding compositions based on poly(arylene sulfide) that have good insulation resistance and surface gloss when molded. It is another object of this invention to provide a filled polymer composition in which calcium sulfate is used as filler. It is still another object of this invention to provide a method for improving surface gloss and insulation resistance characteristics of molded objects produced from poly(arylene sulfide).

Other aspects, objects and the various advantages of this invention will become apparent upon reading this specification and the appended claims.

STATEMENT OF THE INVENTION

According to this invention a composition is provided which has among its components poly(arylene sulfide), fiberglass, and calcium sulfate as essential ingredients and which can contain minor amounts of other well-known additives useful in the preparation of poly(arylene sulfide) compositions.

In one embodiment of the invention a method is provided for attaining compositions based on poly(arylene sulfide) and fiberglass which when molded provide good surface gloss and insulation resistance. By the method of this invention calcium sulfate is admixed with the fiberglass and poly(arylene sulfide) to provide these characteristics. In a further embodiment of the invention both the surface gloss and insulation resistance characteristics can be improved by restricting the calcium sulfate employed to a material that has been finely ground.

The poly(arylene sulfide) resins, often abbreviated PAS, contemplated in the compositions of this invention include those described in U.S. Pat. No. 3,354,129 issued to Edmonds, Jr. and Hill, Jr. on Nov. 21, 1967 and U.S. Pat. No. 3,919,177. The presently preferred polymer is poly(phenylene sulfide), often abbreviated PPS.

The term poly(arylene sulfide) includes homopolymers and the normally solid arylene sulfide copolymers, terpolymers, and the like having melting or softening points of at least 300° F. (149° C.) and more preferably from about 400° to about 900° F. (204°–482° C.). Other examples of poly(arylene sulfides) are poly(4,4'-biphenylene sulfide), poly(2,4-tolylene sulfide), a copolymer of p-dichlorobenzene, 2,4-dichlorotoluene and sodium sulfide, and the like.

The fiberglass useful in the present invention can be chosen from any of those products commercially available which generally find use as fillers and reinforcing agents in polymeric blends.

Similarly, the calcium sulfate useful in this invention can be chosen from among any of those products commercially available which are generally used as fillers in various polymeric blends. The calcium sulfate will have an average particle size within the range of about 0.5 micron up to about 10 microns and preferably will have an average particle size in the range of about 0.5 micron up to about 5 microns. The finely divided calcium sulfate that will usually be employed in the compositions is a commerically available material of which typically, 98 weight percent passes through a 20 micrometer screen and the average particle size is 1.4 micrometers. A typical chemical analysis shows the material to comprise about 97.7 weight percent $CaSO_4$ with the major impurity of $CaCO_3$ . $MgCO_3$ consisting of about 1.3 weight percent. The remaining impurities comprise silica, metal oxides and water totalling about 1 weight percent. As will be illustrated in the examples the surface gloss and the insulation resistance of molded compositions containing poly(arylene sulfide) and calcium sulfate become greater as the average size of the calcium sulfate particles is decreased.

As is usual in polymeric blends based on poly(arylene sulfide) a variety of other additives can be used in minor amounts of up to about 2 percent by weight of the total composition. These additives include such materials as flow-improving (processability) agents, silane, and pigments. The invention also embraces the use of other fillers such as talc, calcium metasilicate, carbon black, and iron oxide which can be used in relatively large amounts of even up to 80 percent of the total filler in the composition.

Organic silanes can be of particular use in the compositions to improve water resistance and to decrease or at least stabilize the linear coefficient of expansion and also function as coupling agents for the polymer and the fillers. Specific examples of the silanes include gamma-glycidoxypropyl-trimethoxysilane, methyltrimethoxysilane, beta-(3,4-epoxycyclohexyl)-ethyltrimethoxysilane, N-beta(N-vinylbenzylamine) ethyl gamma-aminopropyltrimethoxysilane monohydrogen chloride, gamma-mercaptopropyltrimethoxysilane and the like. The latter compound is presently preferred.

The processability agents that can be employed in the invention compositions are selected from among solid ethylene polymers (see U.S. Pat. No. 4,134,874), saturated fatty acid salts such as zinc stearate and the N,N'-alkylenebis(alkanamides), glycerides and phosphated glycerides of saturated fatty acids containing from 10–30 carbon atoms, mono- and dialkanolamides derived from saturated fatty acids and esters derived from a saturated long-chain fatty acid and long-chain saturated aliphatic alcohol.

The mineral fillers encompass talc, silica, calcium carbonate, lithium carbonate, and the like, such as disclosed in U.S. Pat. No. 4,176,098. Mineral fibers such as processed mineral fibers, Wollastonite, etc. can also be used.

The pigments employed in the compositions are those conventionally known which can tolerate the relatively high processing temperatures required, e.g., 600° F. Typical examples include titanium dioxide, iron oxide, cadmium sulfide, phthalocyanine blue, carbon black, and the like and mixtures thereof.

The glass employed in the compositions can be selected from among fibers, beads and hollow spheres. Generally, fibers are preferred and they can consist of roving and chopped strands, e.g., about 50–3000 μm long and about 5–190 μm in diameter.

In general, the three essential ingredients of the composition will be present in amounts ranging from about 30 to about 65 percent by weight, preferably about 30 to about 50 percent by weight of poly(arylene sulfide); about 5 to about 50 percent by weight, preferably about 5 to about 40 percent by weight of fiberglass; and from about 2 to about 60 weight percent, preferably about 5 to about 50 weight percent of calcium sulfate. The amount of calcium sulfate stated above can be partially substituted by other fillers but there should be a minimum of about 5 percent by weight of calcium sulfate present in the compositions of this invention when mixed fillers are used.

The mode of mixing or blending compositions useful in the present process include the conventional processes as known in the art. Particularly useful is dry blending using commercial apparatus followed by extrusion and pelleting using commercial apparatus.

The examples following should be taken as exemplary and not exclusive in illustrating the invention.

The arylene sulfide polymers, especially poly/phenylene sulfide), abbreviated PPS, are described in U.S. Pat. Nos. 3,354,129 and 3,919,177.

der were prepared by mixing in a Henschel mixer at 1000 RPM at ambient temperature (about 23° C.). All components except the glass were mixed for 5 minutes, the glass was added and the composition was mixed an additional 30 seconds. Each blend was further processed by passage through a 46 mm extruder at a stock temperature of 600° F. (316° C.) and converted into strands by a die attached to the extruder. The strands were chopped into pellets by rotating knives.

Each composition contained 35 parts by weight PPS (prepared in accordance with U.S. Pat. No. 3,354,129 and thermally precured to a nominal melt flow of 850 g/10 minutes as determined in accordance with ASTMD 1238-70 at 316° C. and 5 kg weight), 35 parts by weight fiber glass unless specified later (Owen-Corning Fiberglass Corp., Toledo, Ohio, designated as grade 49 7AA chopped strands, about ⅛ inch (3.2 mm)) in length, 30 parts by weight filler(s), unless specified otherwise, 1 part by weight $Li_2CO_3$ powder and 0.25 part by weight polyethylene powder having a density of 0.962 $g/cm^3$ and a nominal melt index of about 30 g/10 minutes, ASTMD 1238-70 at 190° C. and 2.16 kg weight.

The fillers employed are as follows:

Calcium sulfate 1, average particle size of 1.4 μm, purchased as grade CA-5 from United States Gypsum Co., Chicago, IL.

Calcium sulfate 2, average particle size of 7.0 μm designated as Snow White ® filler, U.S. Gypsum Co.

Talc, medium oil absorption, high brightness general purpose with a Hegman fineness grade of 4, purchased from Whittaker, Clark and Daniels, Plainfield, NJ designated as 2620 grade.

Calcium carbonate 1, average particle size of 3 μm, purchased as Camel-Wite ® fine ground limestone from Stone Products, Hunt Valley, MD.

Calcium carbonate 2, average particle size of 10–15 μm, 99.5 percent through 325 mesh, purchased as number 10 white from Georgia Marble Co., Tate, GA).

The test specimens for tensile strength and elongation, flexural modulus and flexural strength, insulation resistance, arc resistance and Izod impact strength were prepared by injection molding of the pellets in a 2 oz (57 g) machine at a stock temperature of 600° F. and a mold temperature of 275° F. (135° C.).

The test specimens were evaluated according to the following procedures:

| | |
|---|---|
| tensile (MPa) and elongation (%): | ASTMD 638 type IV bars crosshead speed of 0.5 cm/min |
| flexural modulus (GPa) and flexural strength (MPa): | ASTMD 790 |
| Izod impact strength (joules/m): | ASTMD 256 |
| arc resistance (seconds): | ASTMD 495 |
| arc tracking (inches/minute): | UL764A |
| flow rate (g/10 minutes): | ASTMD 1238-70, 316° C. and 5 kg load | spiral flow (cm), above described injection molding machine at stock temperature of 615° F. (324° C.), a mold temperature of 200° F. (90° C.), maximum injection speed and a pressure of 18,500 psi (1280 MPa), mold channel depth of 1/16" and width of ¼", insulation resistance (48 hours, 90° C., 95 percent relative humidity). General method, ASTMD 257, method for controlling relative humidity is given in ASTM recommended practice E104.

EXAMPLE I

Dry blends of PPS Powder, fiber glass, mineral filler(s), lithium carbonate and linear polyethylene powder The nature of each composition and the results obtained are presented in Table 1.

TABLE I

| | Properties of PPS-Filler Compositions | | | |
|---|---|---|---|---|
| | Invention | Control | Control | Control |
| Run No. | 1 | 2 | 3 | 4(a) |
| Filler | CaSO$_4$ 1 | CaCO$_3$ 1 | CaCO$_3$ 2 | CaSO$_4$ 1(15) CaCO$_3$ 1(15) |
| Flow rate, g/10 minutes | 132 | 104 | 105 | 117 |
| Spiral flow, inches (cm) | 10⅜(26.4) | 10⅜(26.4) | 10¼(26.0) | 11(27.9) |
| Tensile strength, psi (MPa), unannealed | 14,300(98.5) | 13,100(90.3) | 14,500(100) | 13,050(90.0) |
| Elongation, % | 0.63 | 0.46 | 0.63 | 0.57 |
| Flexural modulus, psi($\times 10^6$)(GPa) | 2.33(16.1) | 2.40(16.6) | 2.31(15.9) | 2.30(15.9) |
| Flexural strength, psi(MPa) | 22,500(155) | 20,500(141) | 22,200(153) | 20,700(143) |
| Izod impact strength | | | | |
| notched, ft. lbs/in (J/m) | 0.93(50) | 0.73(39) | 0.92(49) | 0.71(38) |
| unnotched, ft. lbs/in (J/m) | 2.46(132) | 1.79(96) | 2.62(140) | 1.94(104) |
| Arc resistance, seconds | 182 | 181 | 181 | 178 |
| Arc tracking, inches/min | 0 | 0 | 1.3 | 0 |
| Insulation resistance, ohms | Infinity | $2.3 \times 10^{10}$ | $7.2 \times 10^9$ | $2 \times 10^{12}$ |

(a)Composition contains 15 parts by weight each of CaSO$_4$ 1 and CaCO$_3$ 1.

In comparing the composition of invention run 1 containing 30 parts by weight of 1.4 μm particle size CaSO$_4$ with the compositions of control run 2 containing 30 parts by weight 3.0 μm particle size CaCO$_3$ and control run 3 containing 30 parts by weight 10-15 μm particle size CaCO$_3$ it can be seen that all three compositions display similar properties in spiral flow, tensile strength, flexural modulus and flexural strength. However, the Izod impact strength of invention run 1 is higher than that of control run 2 and similar to that of control run 3. Also, the insulation resistance and the hardness of invention run 1 are superior to those of the control runs. The improvement in insulation resistance using the fine particle size CaSO$_4$ is also observed in invention run 4 in which 50 weight percent of the CaSO$_4$ is replaced by a like weight of fine particle size CaCO$_3$ even though the remaining physical properties are somewhat lower.

Headlamp housings were molded from each of the above compositions and vacuum metallized with aluminum to note the surface appearance. It was observed that the smoothest housing was derived from the composition of invention run 1.

EXAMPLE 2

Following the techniques employed in Example 1, compositions containing 35 parts by weight of the same PPS, 10 parts by weight of the same glass fiber, 55 parts by weight of CaSO$_4$ 2 or 55 parts by weight of CaCO$_3$ 1, 1.07 parts by weight of the same Li$_2$CO$_3$ and 0.25 parts by weight of the same polyethylene were prepared and molded.

The filler used in each composition and the results obtained are given in Table 2.

TABLE 2

| | Properties of PPS-Filler Compositions | |
|---|---|---|
| | Invention | Control |
| Run No. | 5 | 6 |
| Filler | CaSO$_4$ 2 | CaCO$_3$ 1 |
| Flow rate, g/10 min | 30.4 | 26.7 |
| Tensile strength, psi (MPa) | 9250 (63.8) | 9050 (62.4) |
| Elongation, % | 0.48 | 0.48 |
| Flexural modulus, psi($\times 10^6$) (GPa) | 2.76 (1.90) | 2.73 (1.88) |
| Flexural strength, psi (MPa) | 12,300 (84.8) | 11,800 (81.4) |
| Izod impact strength | | |
| notched, ft. lbs/in. (J/m) | 0.68 (36) | 0.52 (28) |
| unnotched, ft. lbs/in. (J/m) | 2.47 (132) | 2.03 (109) |
| Hardness, pencil | 7 | 6 |
| Insulation resistance, ohms | $1.3 \times 10^7$ | $3.2 \times 10^7$ |

Inspection of the data in Table 2 reveal that the relatively coarse particle size CaSO$_4$ of invention run 5 and the fine particle size CaCO$_3$ of control run 6 generally give about equivalent results. That is, the Izod impact strength values of run 5 are somewhat higher than run 6 while flow rate and other mechanical properties of run 5 are only slightly better than those of run 6. However, the insulation resistance of run 6 is slightly better than that of run 5.

These results taken in conjunction with those of Example 1 indicate (indirectly) that fine particle size CaSO$_4$ gives compositions exhibiting better insulation resistance properties that the relatively coarse particle size CaSO$_4$ 2.

EXAMPLE 3

Following the techniques employed in Example 1, compositions containing 33.7 parts by weight of PPS (prepared as before but has a flow rate of about 430), 23.8 parts by weight of the same glass, 0.25 parts by weight of the same glass, 0.25 parts by weight of the same polyethylene, 0.75 parts by weight of inorganic pigment (0.058 wt. percent N110 carbon black, Phillips Petroleum Co., 0.067 wt. percent KY-787 yellow pigment, Du Pont, 0.0625 wt. percent R-2199 red iron oxide, Pfizer), 0.7 parts by weight of N-beta(N-vinylbenzylamine) ethyl gamma-aminopropyltrimethoxy silane monohydrogen chloride, 1.0 parts by weight N,N'-ethylene bis stearamide and a filler. The composition of run 7 contained 10 parts by weight CaSO$_4$ 1 and 28.8 parts by weight talc. The composition of run 8 contained 38.8 parts by weight talc.

The filler used in each composition and the results obtained are reported in Table 3.

TABLE 3

|  | Invention | Control |
|---|---|---|
|  | Run No. | |
|  | 7 | 8 |
|  | Filler | |
|  | CaSO₄ 1 (10) Talc (28.8) | — Talc (38.8) |
| Flow rate, g/10 minutes | 139 | 128 |
| Spiral flow, inches (cm) | 22⅝ (57.5) | 23½ (59.7) |
| Tensile strength, psi (MPa) | 10,800 (74.5) | 11,600 (80.0) |
| Elongation, % | 0.48 | 0.57 |
| Flexural modulus, psi ($\times 10^6$) (GPa) | 2.07 (1.42) | 2.02 (1.39) |
| Flexural strength, psi (MPa) | 15,200 (105) | 12,200 (84.1) |
| Izod impact strength | | |
| notched, ft. lbs/in. (J/m) | 0.47 (25) | 0.43 (23) |
| unnotched, ft. lbs/in. (J/m) | 0.97 (52) | 0.90 (48) |
| Insulation resistance, ohms | $1.2 \times 10^{11}$ | $4.0 \times 10^{10}$ |

The results in Table 3 indicate that substitution of 10 parts by weight of the talc with fine particle size CaSO₄ 1 in invention run 7 yields a composition exhibiting better insulation resistance properties than control run 8 in which talc is the sole mineral filler employed (neglecting the glass reinforcing agent). This result is in line with the other examples. The invention composition also displays somewhat better flexural properties and somewhat better impact properties than the talc-filled composition while the tensile, elongation and spiral flow properties are somewhat poorer (but acceptable).

EXAMPLE 4

Following the techniques employed in Example 1, a series of compositions containing from 35 to 45 parts by weight of PPS (prepared as before but having a flow rate of 140 to 180), 55 to 60 parts by weight of the same glass, 0.25 part by weight of the same polyethylene, and zero or 5 parts by weight of CaSO₄ 1.

The compositions employed and the test results obtained are reported in Table 4.

| PPS Compositions Containing Low Levels of CaSO₄ 1 | | | |
|---|---|---|---|
| Run No. | 9 | 10 | 11 |
| Remarks | Control | Invention | Control |
| PPS, parts by weight | 60 | 55 | 55 |
| Glass, parts by weight | 40 | 40 | 45 |
| CaSO₄ 1, parts by weight | 0 | 5 | 0 |
| Tensile strength, psi (MPa) | 20,200(139.4) | 19,600(135.2) | 24,600(169.7) |
| Elongation, % | 1.1 | 0.99 | 1.0 |
| Flexural strength, psi (MPa) | 27,000(186.3) | 26,900(185.6) | 30,000(207.0) |
| Izod impact strength | | | |
| notched, ft. lbs/in (J/m) | 1.5(79) | 1.4(75) | 1.6(85) |
| unnotched, ft. lbs/in (j/m) | 5.9(312) | 4.8(254) | 6.8(360) |
| Comparative tracking index, volts | 125 | 175 | 150 |
| Insulation resistance, ohms | $3.8 \times 10^{10}$ | $9.9 \times 10^9$ | $3.4 \times 10^9$ |

In comparing control run 9 with invention run 10 it can be seen that replacing 5 parts by weight PPS with CaSO₄ 1 does not hurt the mechanical properties but does slightly improve the insulation resistance and significantly improves the comparative tracking index from 125 volts to 175 volts.

In comparing control run 11 with invention run 10 the results show that replacing 5 parts by weight glass with CaSO₄ 1 impairs the mechanical properties somewhat but comparative tracking index and insulation resistance properties, on the other hand, are improved.

This example shows the beneficial effects of using low CaSO₄ 1 levels in PPS compositions containing glass and no other filler.

The examples show that fine particle size CaSO₄ 1 provides compositions exhibiting better insulation resistance properties than compositions filled with several kinds of CaCO₃, with talc and suggests that fine particle size CaSO₄ is better in these respects than coarser particle size CaSO₄. The mechanical properties of the various blends at equivalent filler and other component loadings and PPS used are generally about the same.

The results suggest that at least a portion of other common fillers including CaCO₃, talc, clay and the like can be replaced, preferably with the fine particle size CaSO₄ 1 filler to obtain suitable compositions for various uses, especially such uses as encapsulation of electronic parts where good insulation resistance is desirable.

I claim:

1. A composition of matter comprising (1) poly(arylene sulfide); (2) fiberglass reinforcing agent; and (3) calcium sulfate.

2. A composition of claim 1 which also comprises at least one additive selected from among the group consisting of polyethylene, waxes, silanes, pigments, and talc with the proviso that when other fillers are used the amount of calcium sulfate will be at least 5 weight percent.

3. A composition of claim 1 in which said poly(arylene sulfide) is present in an amount ranging from about 30 to about 65 percent by weight, said fiberglass is present in an amount ranging from about 5 to about 50 percent by weight and said calcium sulfate is present in an amount ranging from about 2 to about 60 weight percent.

4. A composition of claim 1 wherein said calcium sulfate has a particle size within a range of about 0.5 micron to about 10 microns.

5. A composition of claim 4 wherein said calcium sulfate has a particle size within the range of about 0.5 micron to about 5 microns.

6. A method for providing compositions containing poly(arylene sulfide) and fiberglass as reinforcing agent having good surface gloss and good insulation resistance comprising admixing with said compositions an amount of anhydrous calcium sulfate sufficient to provide good insulation resistance and improved surface gloss.

7. A method of claim 6 for providing improved surface gloss and insulation resistance comprising restricting the particle size of calcium sulfate used in the composition to a range of about 0.5 micron to about 5 microns.

8. A composition of claim 2 wherein said calcium sulfate has a partical size within a range of about 0.5 micron to about 10 microns.

9. A composition of claim 3 wherein said calcium sulfate has a particle size within the range of about 0.5 micron to about 10 microns.

10. The composition of claim 1 wherein said calcium sulfate is anhydrous calcium sulfate.

11. A composition of claim 2 wherein said calcium sulfate is anhydrous calcium sulfate.

12. A composition of claim 3 wherein said calcium sulfate is anhydrous calcium sulfate.

13. A composition of claim 4 wherein said calcium sulfate is anhydrous calcium sulfate.

14. A composition of claim 5 wherein said calcium sulfate is anhydrous calcium sulfate.

15. A method for providing compositions containing poly(arylene sulfide) and fiberglass as reinforcing agent having good surface gloss and good insulation resistance comprising admixing with said compositions an amount of calcium sulfate sufficient to provide good insulation resistance and improved surface gloss.

16. The method of claim 15 for providing improved surface gloss and insulation resistance comprising restricting the particle size of calcium sulfate used in the composition to the range of about 0.5 micron to about 5 microns.

17. A method of claim 15 wherein said admixing of calcium sulfate provides a composition in which said poly(arylene sulfide) is present in an amount ranging from about 30 to about 65 percent by weight, said fiberglass is present in an amount ranging from about 5 to about 50 percent by weight and said calcium sulfate is present in an amount ranging from about 2 to about 60 weight percent.

18. A method of claim 15 wherein the composition also comprises at least one additive selected from among the group consisting of polyethylene, waxes, silanes, pigments, and talc.

19. A method of claim 6 wherein said admixing of anhydrous calcium sulfate provides a composition in which said poly(arylene sulfide) is present in an amount ranging from about 30 to about 65 percent by weight, said fiberglass is present in an amount ranging from about 5 to about 50 percent by weight and said calcium sulfate is present in an amount ranging from about 2 to about 60 weight percent.

20. A method of claim 6 wherein the composition also comprises at least one additive selected from among the group consisting of polyethylene, waxes, silanes, pigments, and talc.

* * * * *